US008963690B2

(12) United States Patent
Turner et al.

(10) Patent No.: US 8,963,690 B2
(45) Date of Patent: Feb. 24, 2015

(54) IDENTIFICATION SYSTEM

(71) Applicant: ZIH Corp., Lincolnshire, IL (US)

(72) Inventors: Christopher Gordon Gervase Turner, Oakley (GB); Albertus Jacobus Pretorius, Kunwini (ZA)

(73) Assignee: Zih Corp., Lincolnshire, IL (US)

( * ) Notice: Subject to any disclaimer, the term of this patent is extended or adjusted under 35 U.S.C. 154(b) by 0 days.

(21) Appl. No.: 13/772,928

(22) Filed: Feb. 21, 2013

(65) Prior Publication Data
US 2013/0234833 A1 Sep. 12, 2013

Related U.S. Application Data

(63) Continuation of application No. 12/173,646, filed on Jul. 15, 2008, now Pat. No. 8,427,282.

(51) Int. Cl.
*H04Q 5/22* (2006.01)
*G06K 7/10* (2006.01)
*G06K 7/00* (2006.01)
*H04L 1/00* (2006.01)

(52) U.S. Cl.
CPC .......... *G06K 7/10019* (2013.01); *G06K 7/0008* (2013.01); *H04L 1/008* (2013.01)
USPC ..... 340/10.4; 340/10.42; 340/10.1; 340/10.2; 714/758

(58) Field of Classification Search
CPC ....................................................... G06F 3/064
See application file for complete search history.

(56) References Cited

U.S. PATENT DOCUMENTS

| 4,471,345 | A | * | 9/1984 | Barrett, Jr. ................. 340/572.1 |
| 5,467,341 | A | | 11/1995 | Matsukane et al. |
| 5,530,702 | A | | 6/1996 | Palmer et al. |
| 5,627,829 | A | | 5/1997 | Gleeson et al. |
| 5,640,151 | A | | 6/1997 | Reis et al. |
| 5,825,302 | A | | 10/1998 | Stafford |
| 5,995,017 | A | | 11/1999 | Marsh et al. |
| 6,430,196 | B1 | | 8/2002 | Baroudi |

(Continued)

FOREIGN PATENT DOCUMENTS

| EP | 0 467 036 A2 | 1/1992 |
| EP | 1 060 454 B1 | 7/2003 |

(Continued)

OTHER PUBLICATIONS

Search Report and Written Opinion for PCT/US2008/087895 filed Aug. 24, 2009.
Degermark et al., *IP Header Compression*, [online] [retrieved Apr. 9, 2013] Retrieved from the Internet <URL: http://www.rfc-editor.org/rfc/rfc2507.txt>.
*Short Message Peer to Peer Protocol Specifification* v3.4, SMPP Developers Forum, Dublin, Ireland, (Oct. 12, 1999) 169 pages.

*Primary Examiner* — Daniel Wu
*Assistant Examiner* — Frederick Ott
(74) *Attorney, Agent, or Firm* — Alston & Bird LLP

(57) ABSTRACT

A method of identifying a plurality of transponders, the method comprising receiving at an interrogator one or more data transmission blocks from each transponder, wherein the first data block contains a uniquely detectable transponder identity and zero or more further data blocks defining a set of data blocks making up a transponder transmission. The first data transmission block also contains in transmission block number; one or more further data transmission blocks containing additional block data and a respective transmission block number; the block number being changed, by decrement or increment, automatically as each data block is transmitted.

17 Claims, 7 Drawing Sheets

(56) References Cited

U.S. PATENT DOCUMENTS

| | | |
|---|---|---|
| 2002/0001315 A1 | 1/2002 | Tran et al. |
| 2004/0002305 A1* | 1/2004 | Byman-Kivivuori et al. ............ 455/41.2 |
| 2004/0017771 A1 | 1/2004 | Martin et al. |
| 2004/0264441 A1 | 12/2004 | Jalkanen et al. |
| 2006/0279412 A1 | 12/2006 | Holland et al. |
| 2008/0061946 A1 | 3/2008 | Suzuki |

FOREIGN PATENT DOCUMENTS

| | | |
|---|---|---|
| EP | 1 363 470 A1 | 11/2003 |
| WO | WO 99/43113 A1 | 8/1999 |

* cited by examiner

Fig. 6

| | | | | |
|---|---|---|---|---|
| Rdr | ✓ | ✓ | ✓ | ✓ |
| 1Tr | ✓ | ✓ | ✗ | ✓ |
| 2Tr | ✓ | ✗ | ✓ | ✓ |

IDENTIFICATION SYSTEM

BACKGROUND OF INVENTION

The present invention relates to a method of identifying a plurality of transponders through an interrogation process, to an identification system comprising a plurality of transponders and at least one interrogator, to the transponders and to the interrogators themselves.

Radio Frequency Identification (RFID) systems frequently use collision arbitration, also known as anti-collision protocols, so that a plurality of RFID transponders, often referred to as tags, can be present and separately identified by an RFID interrogator (also known as a reader). There are a number of different types of protocol that can be adopted, the two most common of which are tree walking (using binary search or similar techniques) and random transmit and retry generally referred to as Aloha collision arbitration.

Examples of such systems are described by Marsh et al in U.S. Pat. No. 5,995,017, Palmer et al in U.S. Pat. No. 5,530,702 and Reis et al in EP0467036 and Reis et al U.S. Pat. No. 5,640,151, the whole contents of which are incorporated herein by way of reference. In all these known systems, a tag intermittently transmits an identification code or its identity in response to a signal, command or instruction from an Interrogator. The intermittent response is typically at random or pseudo-random intervals. In many embodiments of the subject invention the systems are such that the interrogator is not required to send commands or conduct a two-way dialogue with the tag or tags, however, the subject invention does not excluded such systems and indeed may be used with such systems. When a plurality of tags is present in the energising zone of an interrogator and if all tags transmit their identities in response to a signal from the interrogator, then tag transmissions may collide or clash. By randomly spacing tag transmissions the probability of collisions is reduced. However, the more tags that are present in the interrogator zone, the greater the repeat interval necessary to ensure that all tag identities are received by the interrogator without clashes of tag transmissions occurring. This problem is increased when the tag transmissions become longer, the longer the data packets the greater the likelihood of the tag transmissions clashing.

Tags are frequently required to carry an identification code as well as additional user encoded data. Also, tags and interrogators are frequently used in open systems where the well known method of data layers is used. The tag—interrogator data exchange and data definition layers are thus often separate entities with no shared knowledge. While the length of the tag ID (TID) may always be pre-determined there is no way to determine how much user data is encoded on the tag or is transmitted by the tag. Therefore the tag packet length could be either a variable length data packet or a fixed length packet with unused bits filled with null information, which is wasteful. It should also be noted that a TID is usually but not always defined in such a way to make it uniquely detectable as a TID data message.

One method used to transmit tag ID or data is to break the tag transmission (message) into a number of transmissions (which we call packets) of equal length and to only transmit the number of packets needed to convey the required data. There are two disadvantages to this method. The first is that the interrogator does not know how many packets to expect. The second disadvantage is potentially more serious. If the transmissions from two separate tags clash or overlap, the interrogator may receive a number of packets from a first tag and then when the first tag has sent its data the interrogator may receive one or more packets from a second tag whose transmission may have been slightly weaker and therefore overridden by the first tag transmission. The interrogator has no way to determine whether all the packets originated from a first tag or that they erroneously originated from a first tag followed by a second or even third tag. Interrogators thus normally need to receive a tag transmission multiple times before deciding it is correct, or have knowledge of the data payload; this is often not practical. A packet, as part of a long transponder transmission, may even not be recognised because of RF noise or collisions. This will result in the interrogator believing that it received two or more transmissions from transponders.

SUMMARY OF THE INVENTION

Accordingly, the invention seeks to eliminate or reduce the aforementioned problems.

According to an aspect of the present invention there is provided a method of identifying a plurality of transponders, the method comprising receiving at a interrogator one or more data transmission blocks from each transponder, wherein the first data block contains a uniquely detectable transponder identity and zero or more further data blocks defining a set of data blocks making up a transponder transmission.

In one embodiment the method comprises uniquely combining the chain of data transmission blocks into a single transponder transmission, the single transponder transmissions received at the interrogator may be of variable length and a plurality of transponders may be transmitting in the same time space.

According to a further aspect of the present invention there is provided a method of identifying a plurality of transponders, the method comprising receiving at a interrogator a chain of data transmission blocks from each transponder, wherein the first data transmission block contains a transponder identity and a transmission block number; one or more further data transmission blocks containing additional block data and a respective transmission block number; the block number being changed automatically as each data block is transmitted.

In one embodiment of the invention each data transmission block contains an error checking code.

In a further embodiment the transmission block number is derived from a counter in the transponder, the block number being decremented automatically as each data block is transmitted. Alternatively, the transmission block number may be derived by the block number being incremented automatically as each data block is transmitted. It will be appreciated that the exact sequence of block number change, whether by decrement, increment or combination thereof, for each data transmission block that makes up a single transponder transmission may take a variety of forms with the end result that the interrogator can determine when a single transmission has been received.

In an embodiment the method of identifying a plurality of transponders comprises transmitting a power or interrogation signal to the transponders and receiving response signals from the transponders, each response signal comprising a chain of data transmission blocks; the first transmission containing a transponder identity and further contains a transmission block number derived from a counter in the transponder; one or more further data transmission blocks containing additional block data and a block number; the block number being changed automatically as each data block is transmitted and each data block containing an error checking code.

In one embodiment each data block, which may also be referred to as a data packet or page, is appended a down-counter number indicating the number of blocks to follow and a CRC calculated to include the down-counter number. Thus the interrogator always knows how many data blocks are to follow and also can detect the first data block. It thus has the ability to detect part of the start of a transponder transmission and successfully detects the completion of a transponder transmission or the interruption of a transponder transmission. Although in this embodiment a down-counter number is employed it will be appreciated by those skilled in the art that an up-counter may also be employed, the crucial factor being that the interrogator is informed as to how many data blocks are to be received.

After the interrogator detects the first data block using the uniquely identifiable tag identifier (TID), the interrogator detects the number of pages (data blocks) making up the full transponder transmission whereby the interrogator can reserve space for the set of data blocks, making up the transponder transmission, and fill it in as received. Specific data blocks may not be received or may be wrong as indicated by the CRC; the receiver will leave those blank. The method in accordance with an embodiment of the invention will then use a second transmission to fill in the gaps, even if this transmission also contains wrong data blocks.

In a further embodiment of the invention there is provided a further method of linking data blocks of a transmission. The method comprises using a CRC calculation in a data block which also includes the CRC of the previous data block, with the first packet using a NULL value as the previous data block. The interrogator now can also detect the first data block by using this method thereby enhancing the detection integrity and integrity of the chain of data blocks.

According to a further embodiment of the invention there is provided a method whereby the interrogator, on detection of too many collisions or RF noise, instructs the transponders to change their random number patterns. Furthermore, a tag may adapt its random number pattern in response to the number of clashes detected in a multi-tag environment.

It is known that in an Aloha collision arbitration method employed for transponder transmissions from a plurality of transponders, the transmissions may be of variable length using a plurality of fixed length data packets, separated by a time gap. The first page contains a TID detectable by the data format of the TID and a CRC which forms part of the data of the TID. In a specific application the data packets contain 64 bits of data and the data packet is preceded by 8 preamble bits. The packets are separated by 8 bits in time. In one specific embodiment of the present invention there is appended at the end of each data packet a 3 bit down-counter value and a 5 bit CRC. The interrogator can detect the first page using the TID and determine from data on that first page the number of packets to be received. The interrogator can then detect the intermediate packages and detect their position in the chain and also verify the data packet correctness using the 5 bit CRC. The interrogator then detects the last packet and verifies the data packet correctness using the 5 bit CRC. It is clear that the interrogator may now, in accordance with an embodiment of the invention, use partial transmissions to build up a complete transmission even when never receiving a complete transmission.

An enhancement of the later embodiment is by calculating the 5 bit CRC on the previous CRC, the data and the down-counter. The interrogator now has the ability to detect to which transponder transmission a rogue data packet belongs. This aids the interrogator further to decode a complete transponder transmission in very noisy RF environments.

In one embodiment the transponder or tag, when entering an energising field or signal from an interrogator or reader, may power up into a powered-up state, whereupon the tag waits for a predetermined period, and if at the end of said predetermined period the tag has not detected any modulation in the interrogator signal, the tag will start a random timer within the tag which determines an overall period before the tag enters its transmitting state, the transmitting state being that at which the tag transmits its data message in the form of the chain of data transmission blocks.

In one embodiment the tag reverts back to its powered state after it has transmitted its data message.

In one embodiment, after the execution of a valid command the tag reverts to its powered-up state whereupon it follows a protocol of executing a random internal waiting period before transmitting its message.

In a further aspect of the invention there is provided an identification system comprising an interrogator and a plurality of transponders, the interrogator including a transmitter for transmitting an interrogation signal to the transponders, each transponder including a receiver for receiving the interrogation signal, a transmitter for transmitting a response signal, the response signal comprising a chain of data transmission blocks; the first data block containing the transponder identity and a data block number; one or more further data blocks containing additional block data and a data block number; the block number being changed automatically as each data block is transmitted.

In one embodiment each data packet contains an error checking code.

The block number, which may be derived from a counter in the transponder, can be incremented, decremented or otherwise altered whereby the interrogator or reader can determine when it has received a single transmission from the transponder.

In a yet further aspect of the invention there is provided a transponder, the transponder including a receiver for receiving an interrogation signal from an interrogator, a transmitter for transmitting a response signal after receipt of the interrogation signal, the response signal comprising a chain of data transmission blocks; the first data transmission block containing the transponder identity and further containing a transmission block number derived; one or more further data blocks containing additional block data and a block number; the page number being incremented or decremented automatically as each data block is transmitted.

In one embodiment each data block contains an error checking code.

The transponder may be provided with a counter for changing the block number.

In a further aspect of the invention there is provided an integrated circuit for use in a transponder including a receiver for receiving an interrogation signal, a transmitter for transmitting a response signal after receipt of the interrogation signal, the response signal comprising a chain of data transmission blocks; the first data block containing the transponder identity and further containing a data block number; one or more further data blocks containing additional block data and a block number; the block number being changed automatically as each data block is transmitted.

In one embodiment each data block contains an error checking code.

The integrated circuit may be provided with a counter for changing the block number.

In a further aspect of the invention there is provided an interrogator for identifying a plurality of transponders, the interrogator comprising a transmitter for transmitting an interrogation signal to the transponders and a receiver for receiving response signals from the transponders wherein the interrogator is adapted to identify the transponders from response signals comprising a chain of data transmission blocks; the first data block containing the transponder identity and further containing a block number; one or more further data blocks containing additional block data and a block number; the block number being changed automatically as each data packet is transmitted.

In one embodiment each data block contains an error checking code.

The interrogator may comprise a counter for counting the chain of data transmission blocks received, and a comparator to determining when the number of packages received corresponds to the full data message having been received from the transponder.

In a yet further aspect of the invention there is provided a computer program product operable, when executed on a computer, to perform the method defined above. The product may be implemented as a storage medium, the storage medium comprising one or more from the group consisting of a memory device or a hardware implementation such as an ASIC.

BRIEF DESCRIPTION OF DRAWINGS

FIG. 6 is a simplified diagram showing how an interrogator may complete a transponder transmission using incomplete transmissions and FIG. 7 is a simplified data diagram showing the calculation of the CRC including the previous page's CRC, the first pages using a NULL value.

DESCRIPTION OF THE PREFERRED EMBODIMENTS

In the following description, specific implementations of the invention are described. It will be appreciated by the reader that these are provided by way of example only, and are not intended to provide restriction or limitation on the scope of the invention which is defined in the appended claims.

Figure 1:
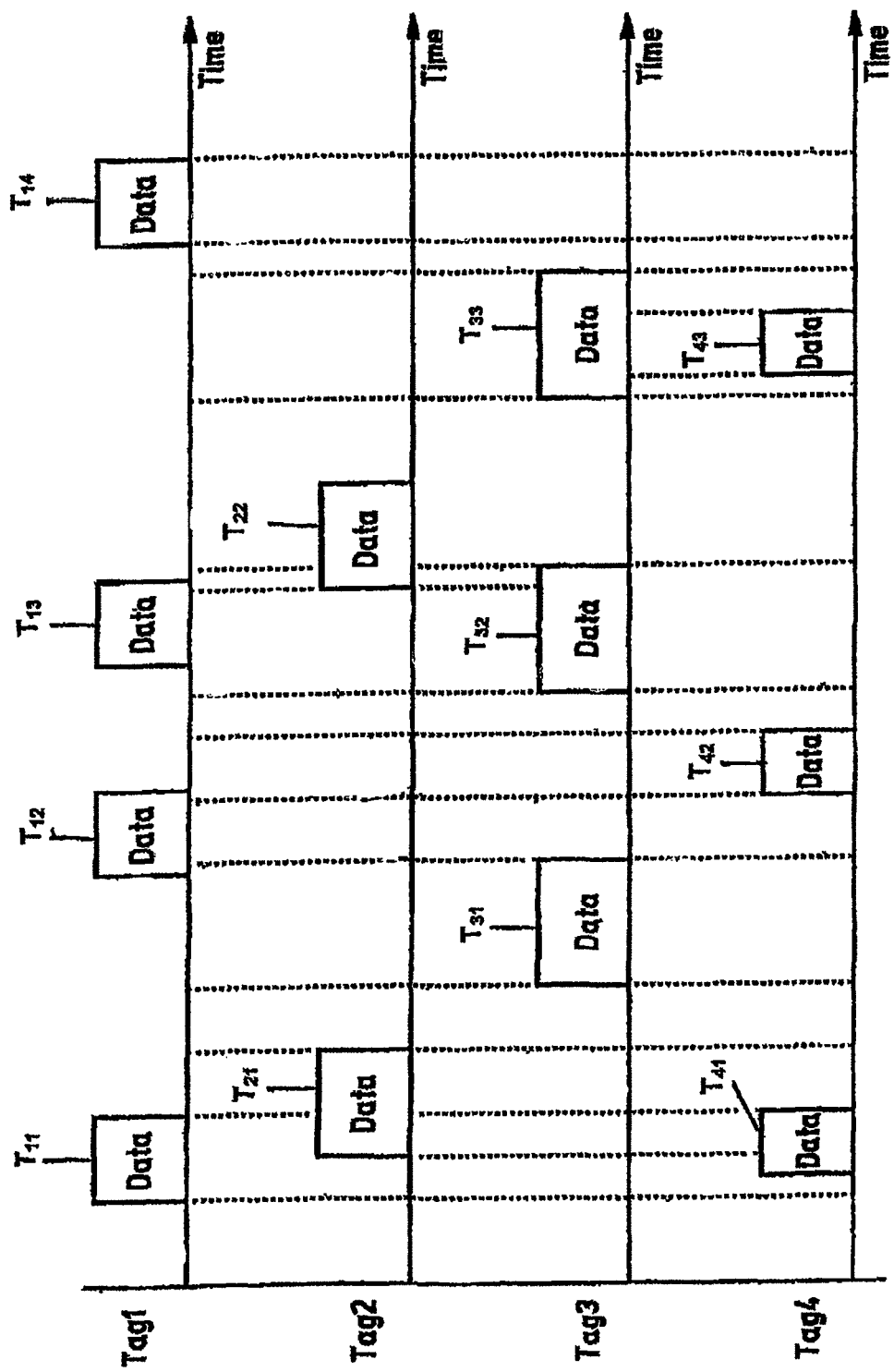
FIG. 1 is a simplified representation of prior art transducer data transmissions.

FIG. 1 illustrates the random or pseudo-random nature in which data packets are transmitted from four tags, and in the case of tag 1 it is only on the fourth transmission $T_{14}$ of its data packet that no clashes between transmissions occur at the receiver. It is only on the fourth transmission $T_{14}$ from tag 1 that the data packet of tag 1 can be read correctly by an interrogator. In the instances when clashing of signals occurs at the interrogator, the received signal is corrupted and the corruption is detected by the interrogator.

However, the detection in corruption of a received signal at the interrogator is dependent on various factors such as the format of the overlapping signals, signal strength and duty cycle. For example, if the data packet from each tag is split into a number of smaller data packets of equal length, defining a concatenated format, the overlapping, clashing concatenated package parts (or pages) may be mistaken at the interrogator as being transmitted by the same tag, and the non-overlapping parts (or pages) may also be read at the interrogator as being from the same tag thereby providing erroneous information as to the data package.

Figure 2:
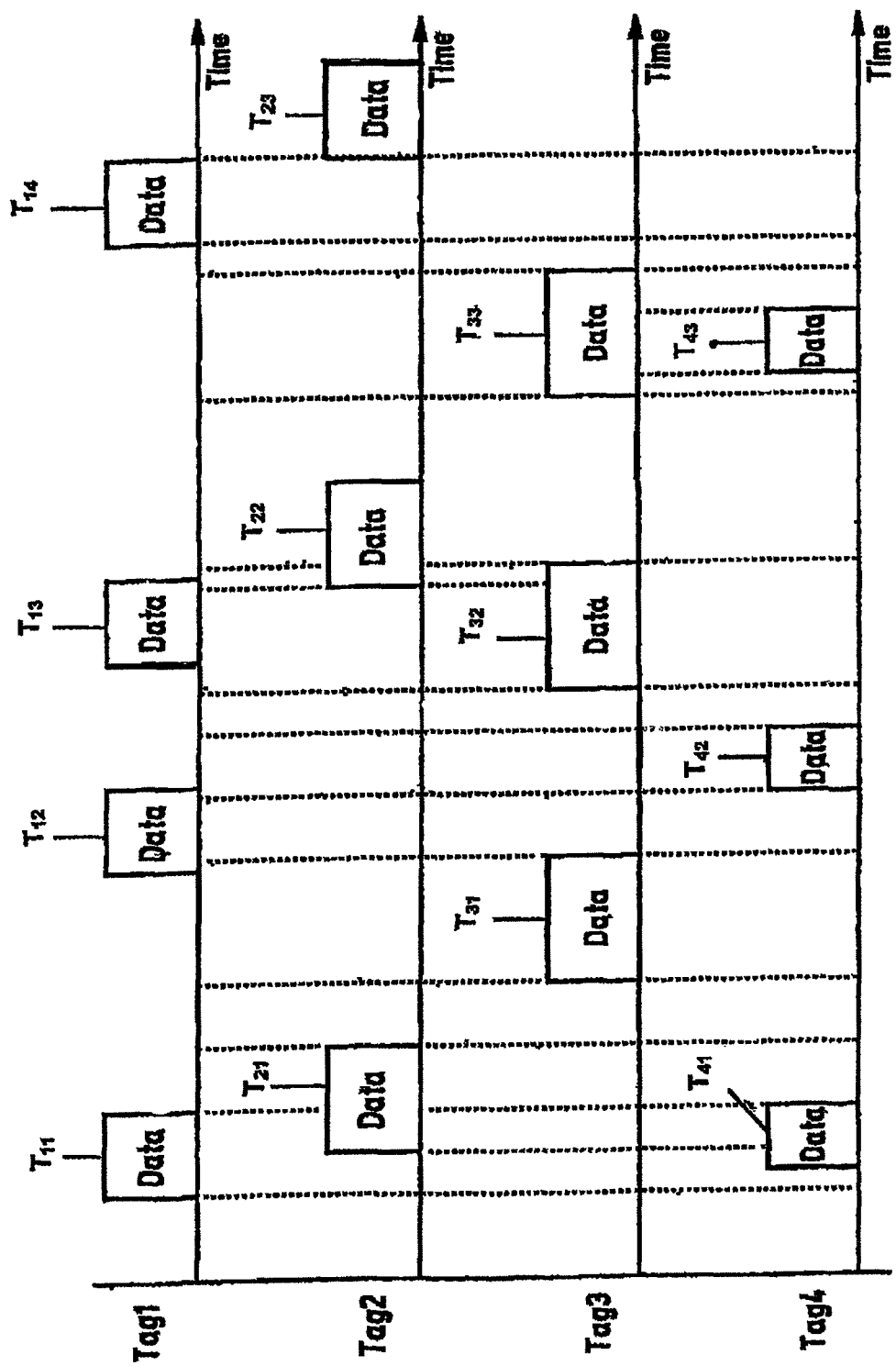
FIG. 2 is a simplified representation, similar to that of FIG. 1, with a difference illustrating a further problem that arises with the prior art transmissions.

FIG. 2 illustrates the data transmission packets shown in FIG. 1 with the single change that a further data packet $T_{23}$ is transmitted randomly from tag 2, which, although not overlapping $T_{14}$, directly follows $T_{14}$. In this instance, even if previous clashes of concatenated data packets from the different tags have been previously recognised as such by the interrogator, the two data packets $T_{14}$ and $T_{23}$ may still erroneously be read together as being one data packet originating from tag 1.

Figure 3:
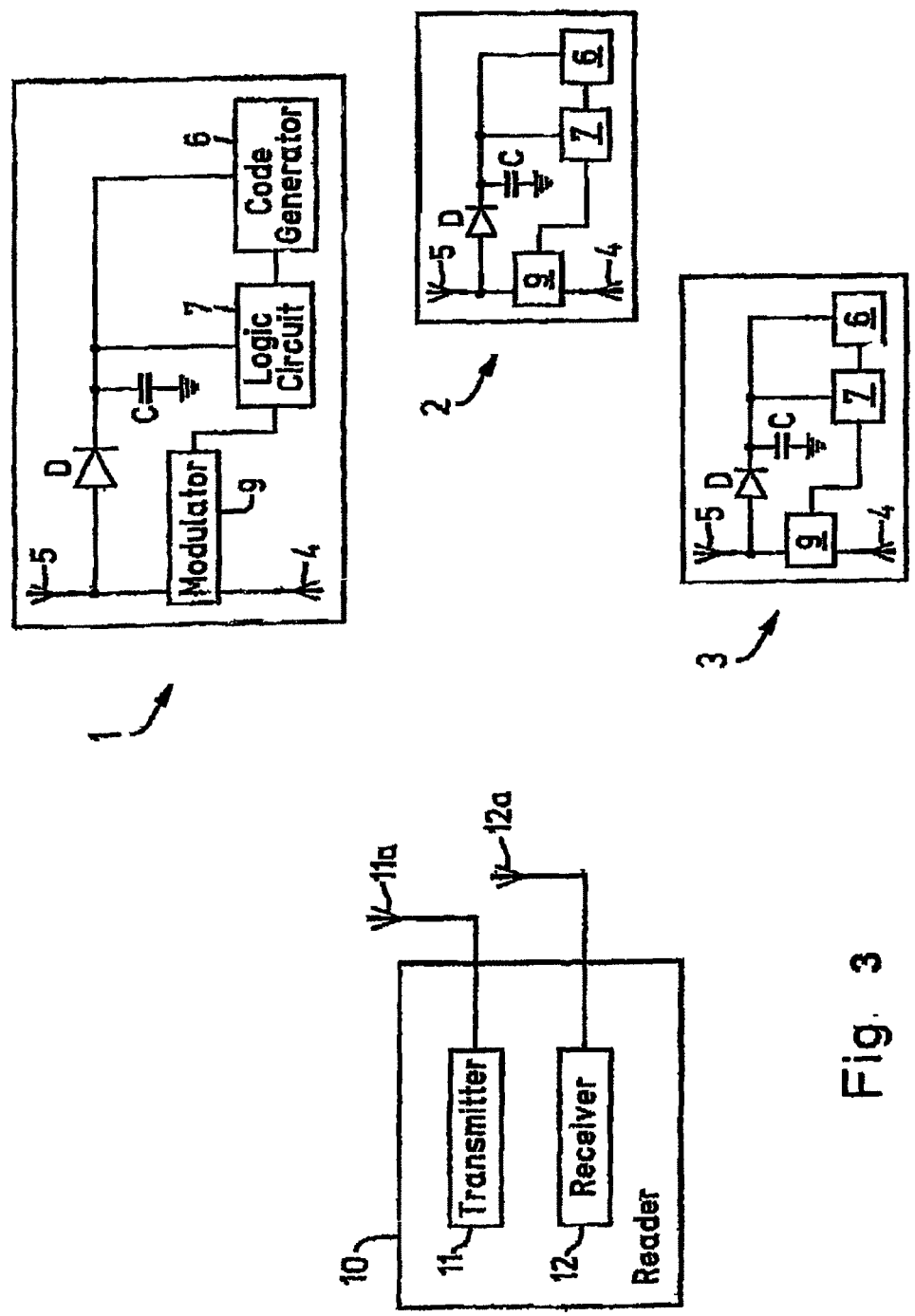
FIG. 3 is a simplified block diagram showing an interrogator and three transponders according to prior art arrangements.

FIG. 3 illustrates an RFID system, typically used in the prior art, the system comprises an interrogator 10, including a transmitter 11 with a transmitting antenna 11a and a receiver 12 with a receiving antenna 12a. The transmitter (11,11a) transmits a powering signal (interrogator signal) to a number of passive transponders (tag 1, tag 2 and tag 3).

Each transponder includes an antenna, the two antenna poles 4 and 5. The transponders within the interrogator field are able to derive a power supply from the energy in the interrogator signal using a capacitor C and a diode D. A code generator 6 and logic circuit 7 generate a signal using a predetermined coding, which is transmitted to the interrogator 10, by modulating a portion of the energy received from the interrogator 10 using a modulator 9 connected to the antenna poles 4 and 5.

The transponders are provided with local timing means. Looking at the operation of the system of FIG. 2 in more detail, on receiving power each transponder executes a random wait cycle before transmitting its code signal as a data packet (or page). In one embodiment if the interrogator detects too many clashes are occurring, the interrogator may transmit an instruction for the transponders to alter their maximum random waiting time. Upon successful receipt of a transponder code signal, the interrogator 10 transmits an acknowledgement signal that disables that transponder.

More particularly, and in accordance with one specific embodiment of the invention, one or more of the tags 1, 2 and 3 in FIG. 3 may have a data memory of 256 bits of data arranged as 4 pages each of 64 bits. The first page contains tag data shown below as IDn followed by an indicator providing the number of pages p and a cyclic redundancy error check code. The first packet transmitted is a standard identification page with a format recognisable to the interrogator. The second and subsequent packets transmitted each contain the next block of tag data followed by a page indicator followed by an error check code.

A "1" page message, employing a down counter, is constructed as a packet containing the elements:
[ID][0][CRC]
    with ID the identification page of the tag message
    with [0] down counter number indicating that no more pages are to follow, and
    with CRC the CRC of the page
A 5 page message, employing a down counter, will be constructed as 5 concatenated packets containing the elements:
[ID][4][$CRC_1$]|[$D_1$][3][$CRC_2$]|[$D_2$][2][$CRC_3$]|[$D_3$][1][$CRC_4$]|[$D_4$][0][$CRC_5$]
    with ID the identification page of the tag message
    with $D_M$ data page M of the tag message with [x] a down counter indicating the number of pages to follow.

with $CRC_N$ the CRC of the page N

The page counter serves two functions, first it indicates the page's original value and secondly it provides the interrogator with an indication of how many pages to expect from the tag. By providing an error check code at the end of each tag page and therefore each transmitted tag packet the error check code in addition to validating the data content of the packet also validates the page number indicator.

In the case of a down counter, by example, the page counter is initially set to the number of data pages to be transmitted and is decremented each time a page is transmitted so that it always indicates the number of pages to follow. The last page transmitted will have the data value of 0. In an alternative embodiment the page counter can be incremented up to a desired page value. In this case the ID page may contain the number of data pages and each on of the data pages are number to its position in the chain. A 5 page tag message will then look as follows:

$[ID][4][CRC_1]|[D_1][1][CRC_2]|[D_2][2][CRC_3]|[D_3][3][CRC_4]|[D_4][4][CRC_5]$

Thus, if two tag transmissions overlap but are not completely synchronised with each other, and if the interrogator receives the transmission from the strongest tag transmission first it will stop decoding when it receives the last packet and will ignore any further packets received.

The tag to interrogator transmission makes use of the known propagating wave backscatter technique. In the specific embodiment the tags are UHF RFID tags and interrogators, however it will be appreciated, tags and interrogators operating in other frequency ranges or using other coupling means such as wave propagation, reactive coupling such as magnetic coupling or capacitive coupling can also be used for carrying out the invention.

The tags transmit their data packets at random or pseudo-random intervals for the purpose of employing unslotted Aloha collision arbitration. Whereas unslotted Aloha is a preferred form of transmission for many tag to interrogator applications, the invention can also be adapted for use with slotted Aloha transmission between the tag and interrogator.

In the specific embodiment described here the interrogator (or reader) does not have to issue a talk command to the tags, it being sufficient for the interrogator to merely transmit an unmodulated carrier signal which supplies the power to the tag. The tag then entering a wake up mode, and after a slight delay, automatically switches into a transmit mode whereby it implements a pseudo-random Aloha transmission of its data packets. It will be appreciated that should the interrogator wish to write to or program a tag, that tag can be provided with a suitable receiver and/or command decoder.

Looking at the RFID communication protocol of the specific embodiment in more detail, a tag will first enter an energising field of an interrogator and when the field, at the tag, reaches a strength above a predefined value, the tag will power up and begin the transmission sequence of its data packets as described above.

As referred to earlier an unmodulated carrier wave from the interrogator is sufficient for the power-up of the tag. Any modulation in the carrier signal may indicate communication occurring between the interrogator and a tag, for example the interrogator may send a signal to the tag when it has successfully read its data packet and wishes to mute that tag, and will do this by modulating its carrier wave or transmitting a second signal.

Accordingly, in one embodiment the tags monitor for any modulation for a predefined period and if any modulation is detected in the interrogator's signal, the tag suspends the backscattering of its data packets. When the interrogator signal reverts to pure carrier wave, the tag waits for a random delay time, with a maximum delay time value, and then backscatters its message. In between backscattering its data packets, the tag may continuously monitor for modulation on the energising carrier signal.

In the description above the tag derives its power from the energising field, the incident energy being rectified and smoothed power the circuits. Alternatively the tag may be provided with a battery to facilitate the powering of the tag. The tag can still use backscatter modulation for transmitting its message. Furthermore, when a tag uses a battery to assist its circuits, it may incorporate a signal detection circuit to detect the presence of an interrogator transmission or carrier wave and use the resulting signal detection to cause the tag to transmit its message.

The various states in which a transponder operates is illustrated in a specific embodiment shown in FIG. 4, it will be appreciated the transponder can operate in many other configurations and is in no way limited to the implementation to be described below with reference to FIG. 4.

Figure 4:
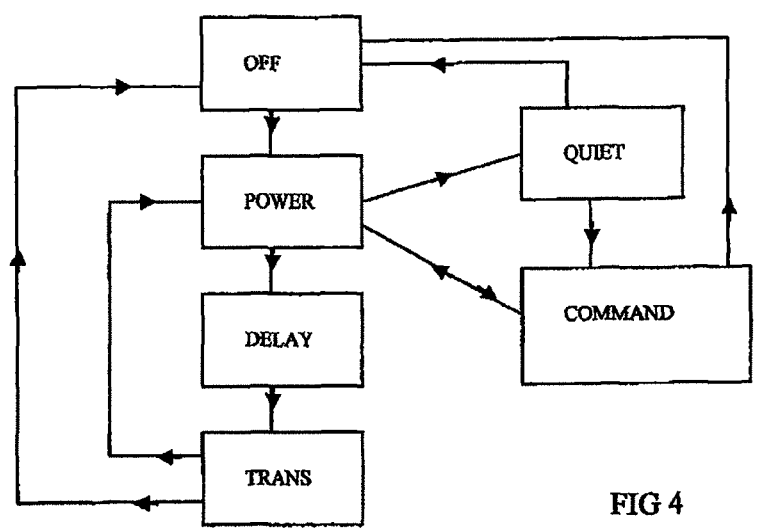
FIG. 4 is a flow diagram illustrating the various operational states of a transponder in accordance with one embodiment of the invention.

A transponder starts in an OFF STATE until it finds itself in an energising field provided by the interrogator, the energising field being of a sufficient strength to wake up the tag, the tag will then power up into what is shown in FIG. 4 as the POWER state.

When the tag is in the POWER state there are various operational modes for the tag. In the first mode the tag waits for a predetermined period, typically a few milliseconds, and if at the end of this short period it has not detected any modulation in the interrogator signal it will start a random timer within the tag which determines the overall DELAY period before entering its TRANS state, the TRANS state being that at which the tag transmits its data message in the form of a series of concatenated data packages.

After sending its message in this way, the tag reverts back to the POWER state and if it detects modulation in the interrogator of a specific nature will pass either into the QUIET or COMMAND state. The tag may determine the modulated signal from the interrogator as acknowledging the tag's message has been successfully received and the tag can then pass into the QUIET state where it is muted for a defined period before passing to the OFF state when the energising field is removed. Alternatively the modulation in the interrogator signal may indicate communication between the interrogator with another tag, in which event the tag still passes into the QUIET state where it may detect a power reset command or another valid command to change it into the COMMAND state. When in the COMMAND state the tag suspends the transmission of its messages and executes any valid command from the interrogator, and after the execution of that command may revert to the POWER state whereupon it follows the protocol of executing a random internal waiting period before transmitting its message.

In the above manner the tag will implement an RFID protocol in accordance with one specific embodiment of the present invention.

Figure 5:
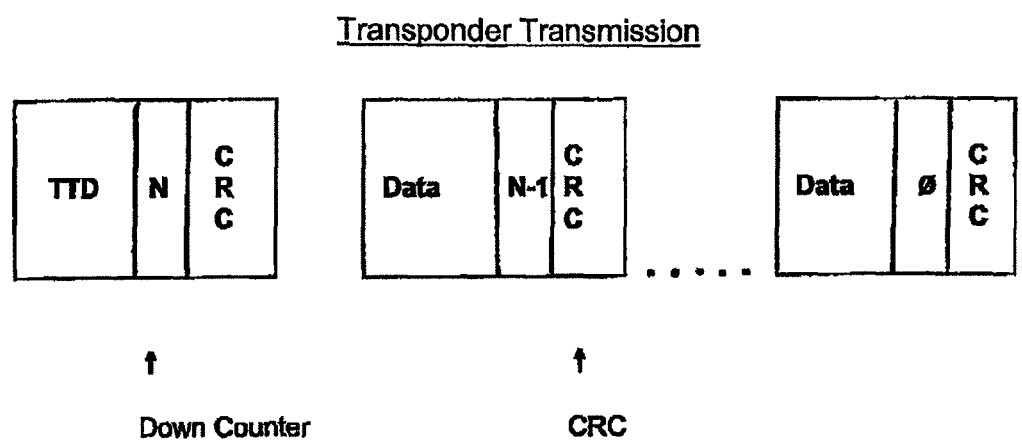
FIG. 5 is a simplified data representation of a transponder transmission consisting of N+1 pages of user data with a down-counter number and CRC appended.

FIG. 5 is a simplified data representation of a transponder transmission consisting of N+1 pages of user data with the down-counter number and CRC appended. The first page, or data block, provides a transponder identity TID followed by the number of data pages N in the transmission and the CRC for that data block. The next data block provides user data with an indication of the changed data block number, now N−1, and a further CRC. This process is continued until the final data block is received at the interrogator, indicated by data block number zero followed by a CRC.

Figure 6:
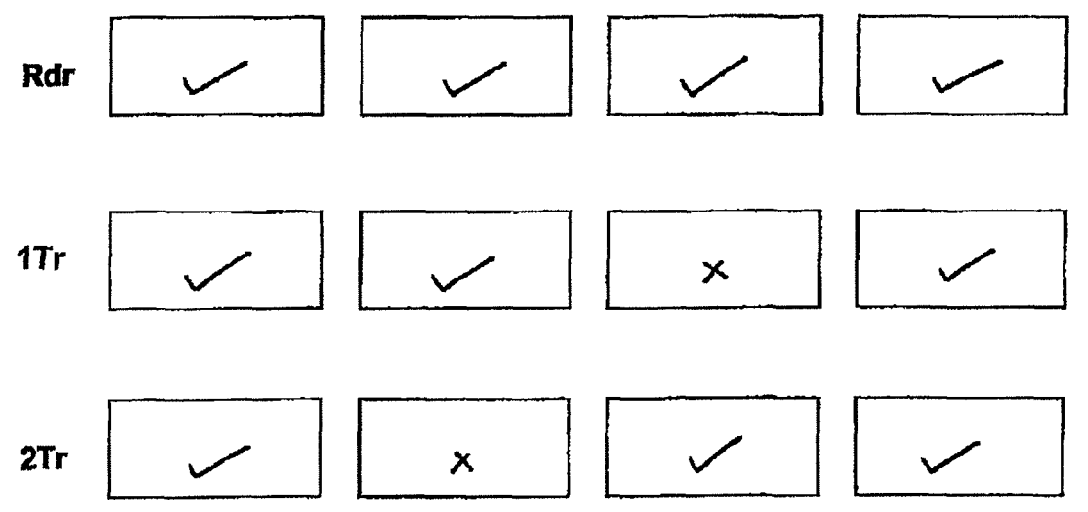

FIG. 6 is a simplified diagram showing how an interrogator may complete a transponder transmission using incomplete transmissions. In the example shown the transponder transmission consists of four data blocks. After the first data transmission the interrogator has correctly identified the first, second and fourth data blocks but has disregarded the third as it may have been involved in a collision or is otherwise corrupted. The interrogator therefore waits for the second transmission from the same transponder, in this case the interrogator has correctly identified the first, third and fourth data block in the transmission, it can therefore incorporate the second data block into its memory thereby assembling the complete transmission from the transponder.

Figure 7:
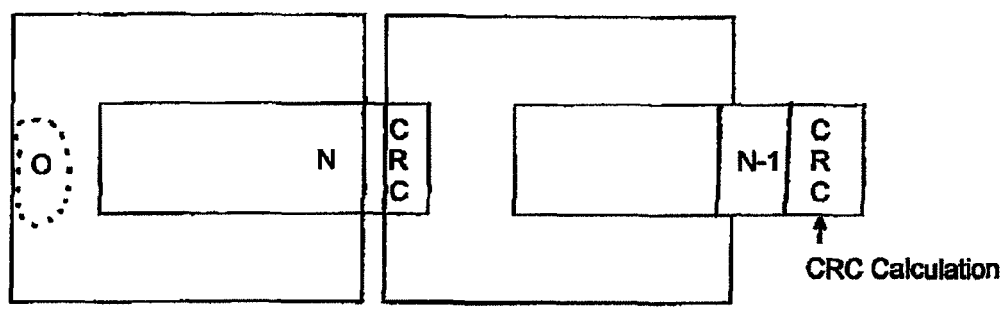

FIG. 7 is a simplified data diagram showing the calculation of the CRC including the previous page's CRC, the first page using a NULL value. The method comprises using a CRC calculation in a data block which also includes the CRC of the previous data block, with the first packet using a NULL value as the previous data block. The interrogator now can also detect the first data block by using this method thereby enhancing the detection integrity and integrity of the chain of data blocks.

What is claimed is:

1. A method of identifying a plurality of transponders, the method comprising receiving at an interrogator a chain of data transmission blocks from each transponder, wherein a first data transmission block in the chain of data transmission blocks contains a transponder identity, a data transmission block number derived from a counter in the transponder, and number of data transmission blocks in the chain of data transmission blocks; one or more further data transmission blocks containing additional block data, the data transmission block number and an error checking code, wherein the error checking code for each of the one or more further data transmission blocks is calculated based on a previous further data transmission block; the data transmission block number being changed automatically as each data block is transmitted.

2. The method according to claim 1 wherein the first data transmission block further contains an error checking code comprising a null value.

3. The method according to claim 1 wherein the transmission block number indicates a number of remaining data transmission blocks.

4. The method as claimed in claim 1 wherein the block number is decremented automatically as each data transmission block is transmitted.

5. The method as claimed in claim 1 wherein the data transmission block number is incremented automatically as each data transmission block is transmitted.

6. The method according to claim 1, wherein the data transmission block number derived from a counter in the transponder such that the data transmission block number is derived from a random or pseudo-random number corresponding to a random delay time before the transponder enters its transmitting state.

7. A method of identifying a plurality of transponders comprises transmitting an interrogation signal to the transponders and receiving response signals from the transponders, each response signal comprising a chain of data transmission blocks; a first data transmission block in the chain of data transmission blocks containing a transponder identity, a data transmission block number derived from a counter in the transponder, and further containing a number of data transmission blocks in the chain of data transmission blocks derived from the counter in the transponder; one or more further data transmission blocks containing additional block data, and an error checking code, wherein the error checking code for each of the one or more further data transmission blocks is calculated based on a previous further data transmission block; the data transmission block number being decremented automatically by the transponder as each data transmission block of the one or more further data transmission blocks is transmitted.

8. The method according to claim 7, wherein the first data transmission block contains an error checking code comprising a null value.

9. The method according to claim 7, wherein the data transmission block number derived from a counter in the transponder such that the data transmission block number is derived from a random or pseudo-random number corresponding to a random delay time before the transponder enters its transmitting state.

10. An identification system comprising an interrogator and a plurality of transponders, the interrogator including a transmitter for transmitting an interrogation signal to the transponders, each transponder including a receiver for receiving the interrogation signal, a transmitter for transmitting a response signal, the response signal comprising a chain of data transmission blocks; a first data transmission block in the chain of data transmission blocks containing a transponder identity, a data transmission block number derived from a counter in the transponder, and further containing a number of data transmission blocks in the chain of data transmission blocks derived from the counter in the transponder; and one or more further data transmission blocks in the chain of data transmission blocks containing additional block data number and an error checking code, wherein the error checking code for each of the one or more further data transmission blocks is calculated based on a previous further data transmission block; the data transmission block number being changed automatically by the transponder as each data transmission block is transmitted.

11. The identification system as claimed in claim 10, wherein the first data block further contains an error checking code comprising a null value.

12. A transponder, the transponder including a receiver for receiving an interrogation signal from an interrogator, a transmitter for transmitting a response signal after receipt of the interrogation signal, the response signal comprising a chain of data transmission blocks; a first data transmission block containing a transponder identity, a data transmission block number derived from a counter in the transponder, and a number of data transmission blocks in the chain of data transmission blocks derived from the counter in the transponder; and one or more further data transmission blocks containing additional block data number and an error checking code, wherein the error checking code for each of the one or more further data transmission blocks is calculated based on a previous further data transmission block; the data transmission block number being changed automatically as each data block is transmitted.

13. The transponder as claimed in claim 12 wherein the first data transmission block further contains an error checking code comprising a null value and wherein the data transmission block number indicates a number of remaining data transmission blocks of the number of data transmission blocks in the chain of data transmission blocks.

14. The transponder as claimed in claim 12, wherein the data transmission block number derived from a counter in the transponder such that the data transmission block number is derived from a random or pseudo-random number corresponding to a random delay time before the transponder enters its transmitting state.

15. An integrated circuit for use in a transponder including a receiver for receiving an interrogation signal, a transmitter for transmitting a response signal after receipt of the interrogation signal, the response signal comprising a chain of data transmission blocks; a first data transmission block in the chain of data transmission blocks containing a transponder identity, a data transmission block number derived from a counter in the transponder, and a number of data transmission blocks in the chain of data transmission blocks derived from the counter in the transponder; and one or more further data transmission blocks containing additional block data number and an error checking code, wherein the error checking code for each of the one or more further data transmission blocks is calculated based on a previous further data transmission block; the data transmission block number being incremented or decremented automatically as each data block is transmitted.

16. The integrated circuit as claimed in claim 15 wherein the first data block further contains an error checking code comprising a null value and wherein the data transmission block number indicates a number of remaining data transmission blocks of the number of data transmission blocks in the chain of data transmission blocks.

17. The integrated circuit as claimed in claim 15, wherein the data transmission block number derived from a counter in the transponder such that the data transmission block number is derived from a random or pseudo-random number corresponding to a random delay time before the transponder enters its transmitting state.

* * * * *